United States Patent Office.

BENJAMIN I. CREW, OF PHILADELPHIA, PENNSYLVANIA.

Letters Patent No. 79,811, dated July 14, 1868.

IMPROVED MUSTARD-PLASTER.

*The Schedule referred to in these Letters Patent and making part of the same.*

TO ALL WHOM IT MAY CONCERN:

Be it known that I, BENJAMIN I. CREW, of Philadelphia, Pennsylvania, have invented an Improved Mustard-Plaster; and I do hereby declare the following to be a full, clear, and exact description of the same.

My invention consists of a plaster, composed of mustard, deprived of its fixed oil, and mixed with a solution of India rubber, or other equivalent material insoluble in water; the composition being spread on thick paper, or other suitable fabric, so that it may be ready for use at any time, all that is necessary prior to applying the plaster being the steeping of the same for a short time in water, which developes the active properties of the mustard.

I will now proceed to describe the mode of carrying my invention into effect.

In preparing the plaster, the first step after the selection of good mustard, (that imported from Germany is to be preferred,) is to deprive it of its fixed oils. This may be readily accomplished by pouring any of the hydrocarbons on a mass of the powdered mustard, contained in a barrel or other vessel, open at the top, and having perforations below for the escape of the hydrocarbon and the oil of mustard which it has taken up during its passage through the mass.

The mustard, thus deprived of its oil, is then dried, and afterwards mixed with a thin solution of India rubber and naphtha, or other equivalent solvent of that material.

Strong paper or other suitable fabric is then coated with the composition, to such a thickness as to insure the proper effect of the mustard.

Flour or other farinaceous substance, equal in weight to that of the fixed oil removed, may be added to the composition preparatory to applying the same to the fabric. This, however, is not essential.

The presence of fixed oil in mustard induces fermentation and rotting; hence, mustard with the fixed oil present, if mixed with India rubber dissolved in naphtha, and applied to paper as a plaster, would soon decompose and become valueless as a rubefacient. By the preparatory removal of the fixed oil, however, the active principle of the mustard is retained, although in a quiescent state, as long as the plaster is dry.

When the plaster has to be applied, however, it is steeped in water, which at once devolopes the previously dormant essential oil or active properties of the mustard. Hence it will be seen that my improved mustard-plaster can be kept for any length of time without deterioration, and can be used at once, after steeping in water, as a cleanly substitute for the ordinary mustard-plaster.

I claim as my invention, and desire to secure by Letters Patent—

A plaster, composed of mustard deprived of its fixed oils, and mixed with a solution of India rubber, or other material insoluble in water, as set forth.

In testimony whereof, I have signed my name to this specification in the presence of two subscribing witnesses.

BENJ. I. CREW.

Witnesses:
JOHN WHITE,
C. B. PRICE.